United States Patent Office 3,399,719
Patented Sept. 3, 1968

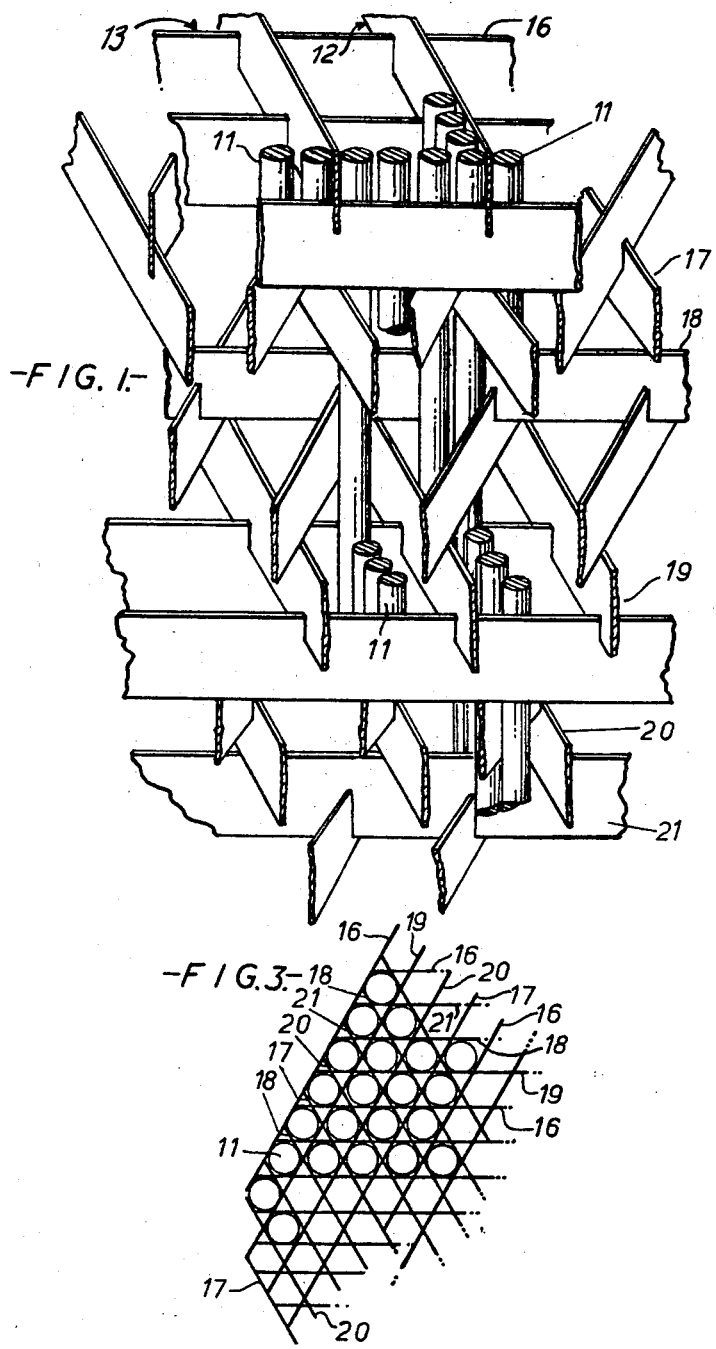

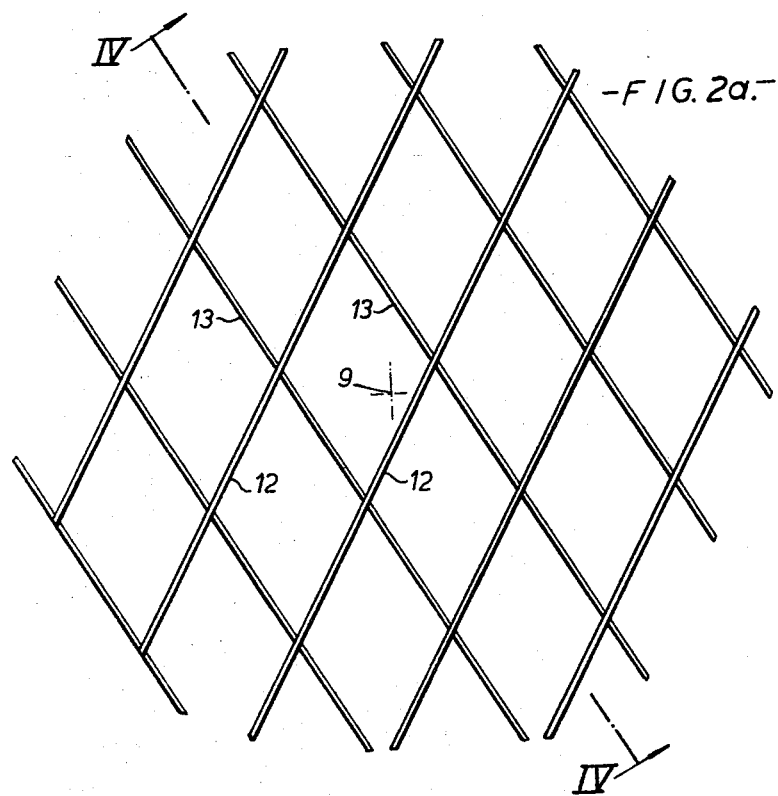

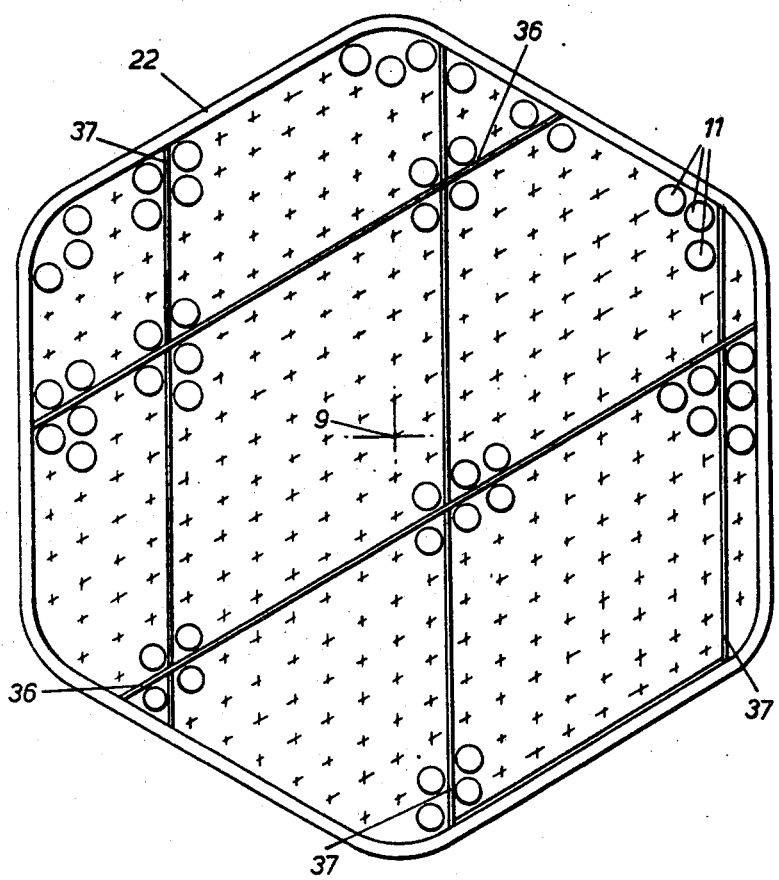

3,399,719
LOCATING STRUCTURE
John Alan Forrest, Etobicoke, Ontario, Canada, and George Oliver Jackson, Timperley, England, assignors to United Kingdom Atomic Energy Authority, London, England
Filed Dec. 9, 1965, Ser. No. 512,693
Claims priority, application Great Britain, Dec. 23, 1964, 52,258/64
10 Claims. (Cl. 165—47)

ABSTRACT OF THE DISCLOSURE

In an assembly of elongate heat exchange elements (for example nuclear reactor fuel rods or pins) arranged parallel to one another in a regular lattice array forming straight rows of elements with gaps between the rows in at least two directions, a locating structure is provided by strips stacked crosswise and on edge to form a stack over substantially the whole heat exchange length of the element array, the strips of each layer in the stack being only in gaps which run in the same direction and being disposed in less than half the number of such gaps, whereas the stack as a whole provides at least one strip in every gap in each direction. The effect is to distribute the locating structure far more extensively in a lengthwise direction than hitherto, and thereby to arrange that the area available for flow is uniform at all levels of the heat exchange length, instead of imposing severe flow restrictions by the hitherto common constructions which employed complete grid structures placed at intervals along the heat exchange length.

---

Figure 2B:
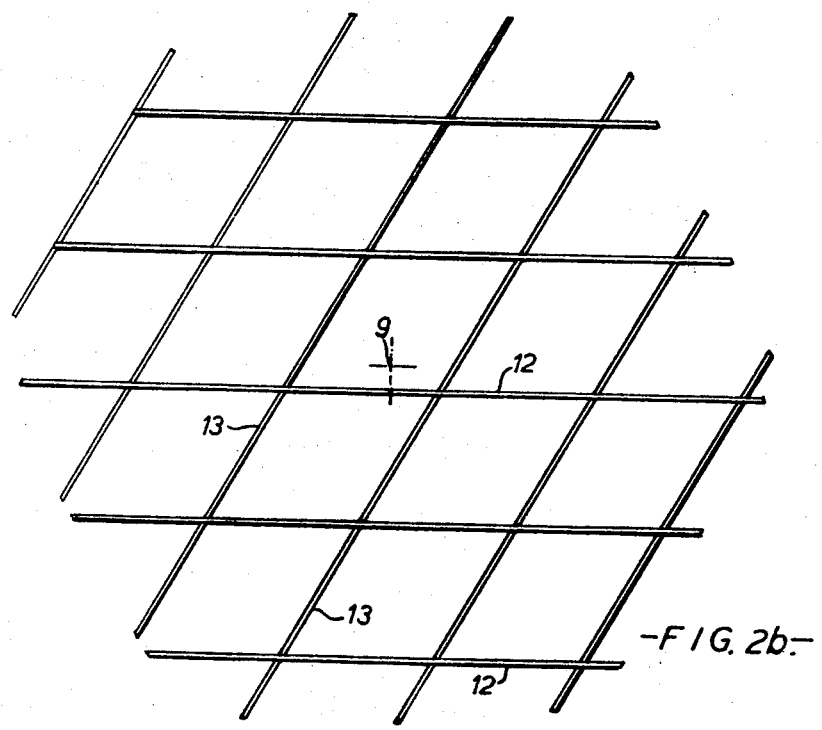

The present invention concerns structures for locating parallel elongate heat exchange elements in a predetermined spaced relationship. This relationship may be such that the elements are in a regular lattice array, and in this case rows of elements are formed in at least two directions. A square lattice gives rows in two directions and a triangular lattice three.

The invention has its prime application in the provision of nuclear reactor fuel element assemblies formed of a number of fuel rods or pins which are maintained substantially parallel to each other and are separated by coolant gaps. Although the advantages of the invention are clearly important in such nuclear reactor applications, the invention is not necessarily limited to such applications. It may be applied in a number of environments, among which may be included tubular heat exchanger assemblies.

It is known to use rigid grid structures at spaced intervals to hold a plurality of elongated elements in position. Such grids consist of a number of cells or pockets formed by strip metal or the like interconnected by cross ties or welded joints to form a self-supporting honeycomb whose dimensions are fixed and substantially invariable. A fluid flows along the outside of the elements and through interstices in the grids. The drawback of such grids is that, with closely spaced elements, the flow of fluid along the element can be greatly impeded by the grids.

According to one aspect of the present invention, there is provided in an assembly of elongate heat exchange elements arranged parallel to one another in a regular lattice array forming straight rows of elements, and gaps between the rows, in at least two directions, a locating structure constituted by strips stacked crosswise and on edge to form a stack over substantially the whole heat exchange length of the element array, the strips of each layer in the stack being only in gaps which run in the same direction and being in less than half the number of such gaps, while the stack as a whole provides at least one strip in every gap in each direction. The effect of this aspect of the invention may be seen when considered in relation to an assembly of 100 elements grouped in a square on a square lattice: there will be nine gaps in each direction calling for 18 strips in the stack to occupy each gap once. However, in each layer there would be no more than four of these strips, preferably fewer, all running in the same direction and the strips of adjacent layers would be at right angles. The minimum number of layers would be five.

The invention has the effect of distributing the locating structure far more extensively in the lengthwise direction of the elements than has been proposed hitherto. Instead of the severe flow restrictions imposed by grids placed at intervals, it is now possible to arrange that the area available for flow is uniform at all levels of the heat exchange length. It is stipulated that the locating structure need not extend beyond this length because the elements may have extensions which do not participate significantly for heat exchange purposes and therefore do not require the same standard of location; for example nuclear reactor fuel pins may have unfuelled lengths which act as a reservoir for fission product gases liberated from the fuel.

The number of strips in each layer of the stack can be so few that an overlap of the layers in pairs may be a practical arrangement. It is preferred that the widths of the strips in each layer are uniform but in general the invention includes variation of width, either locally on an individual strip or as between one strip and another; such an expedient could be used for the purpose of spreading the layers further apart.

According to another aspect of the invention a locating structure for spacing elongate heat exchange elements arranged parallel to one another comprises separately manufactured units of similar pattern of which at least three in a superposed relationship displaced angularly to one another serve together to complete pockets for the elements.

The similarity of pattern is to be taken to imply in relation to straight strips that the spacing between them is uniform in all the units. With straight strips this spacing should be equal to four, or even a greater even number, of pocket widths or pitches; to obtain one strip in every gap in each direction of a regular lattice array the following limitations may be adopted:

(a) In each layer of parallel strips, the two strips nearest to the axis of angular displacement are unequally spaced from this axis,
(b) The layers conform to a number of different types equal to half the spacing between strips expressed in terms of pitches, the types being distinguished by different spacings of the two nearest strips from the angular displacement axis,
(c) The minimum number of each type is equal to twice the number of gap directions, i.e., 2 x 2 for a square lattice and 2 x 3 for a triangular lattice, and in the superposed relationship of the units each type occurs at least once in as many evenly displaced angular orientations as said minimum number, i.e., orientations at 90° for a square lattice and 60° for a triangular lattice.

Each unit may embody more than one layer type and this enables the units to be made identical, as when one of each type is present. In each unit it is preferred that a layer of one type is crosswise to another layer type and that there are interconnections at some at least of the points of intersection so that the strips are braced. Conveniently such interconnection is constituted by interengaging slots whereby some overlap between layers in a unit may pertain. In some circumstances the overlap could be to the point of making two layers coincident.

Figure 4:
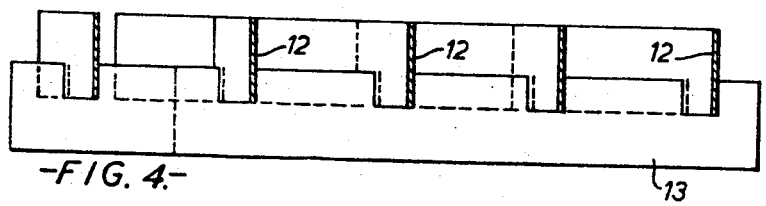
Figure 5:
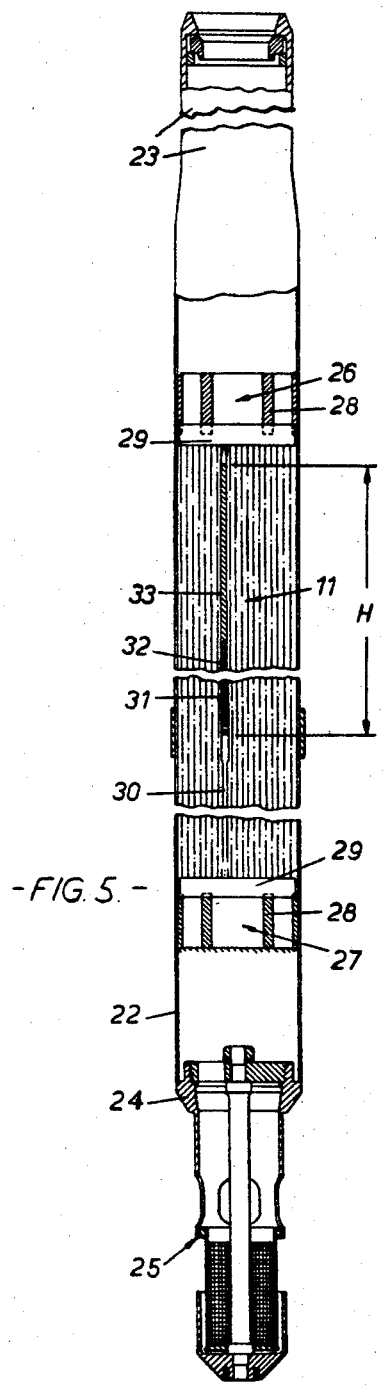
Figure 6A:
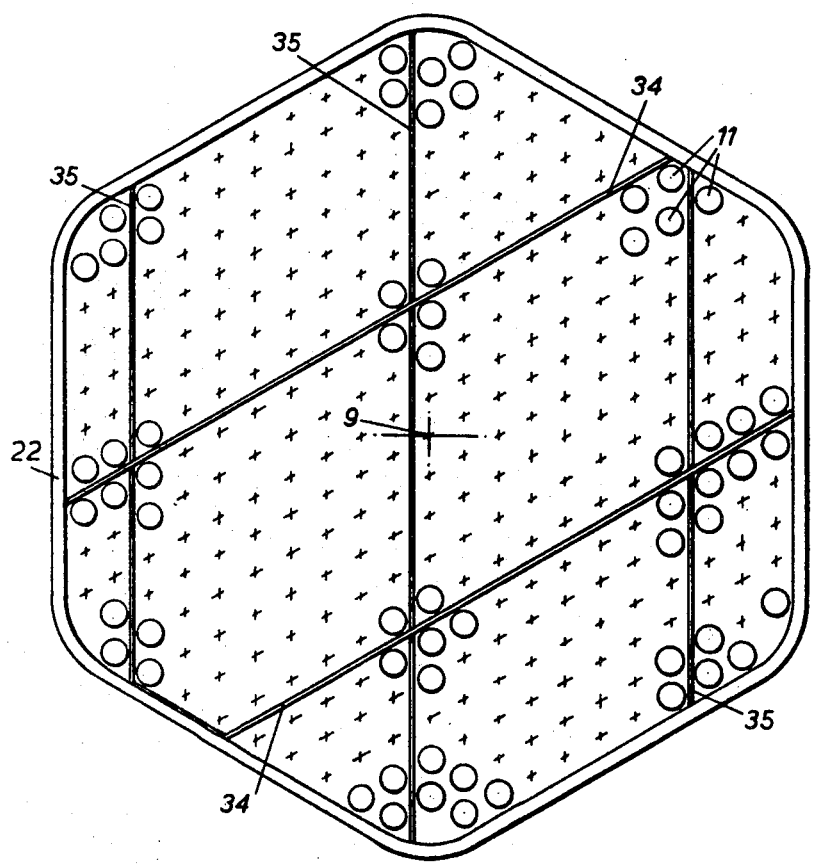

So that the invention may be clearly understood a specific application in a nuclear fuel assembly will now be described by way of example with reference to the accompanying drawings in which;

FIGURE 1 is a diagrammatic perspective view of part of a fuel element assembly for a nuclear reactor showing fuel pins located in a structure in accordance with the invention, FIGURES 2a and 2b are plan views of neighbouring units of the structure, FIGURE 3 is a scrap plan view showing how a sequence of superposed units, as shown in FIGURES 2a and 2b, co-operate to locate the fuel pins, FIGURE 4 is a section on the line IV—IV of FIGURE 2a showing how the members in a layer are interconnected, FIGURE 5 is a partly sectioned view of the fuel assembly, and FIGURES 6a and 6b are cross sections taken at different levels in the lower half of the assembly to show two different forms of unit employed in this half.

A nuclear reactor fuel element assembly of the kind illustrated contains a number of fuel pins such as those indicated at 11 (FIGURES 1 and 3). These fuel pins are parallel to each other and evenly spaced apart in a triangular lattice array by means of a locating structure in which the fuel pins each pass through a separate pocket. A coolant flows through the fuel element assembly along the outside of the fuel pins and in the lengthwise direction thereof.

As shown in FIGURE 1, the metal strips which make up the locating structure, are widely spaced in the lengthwise direction so that the flow of coolant is not unduly impeded.

This wide spacing is achieved by building up the structure from a number of identical units such as that shown in FIGURE 2a. This unit consists of two intersecting sets 12 and 13 of parallel strips spaced apart by four times the desired pocket width or pitch. The sets 12 and 13 intersect at an angle of 60° and in view of the spacing by four pitches two layer types are necessary, each of the two sets of strips in a unit constituting one of these types in this way: In the set 12 the two nearest strips to the central axis 9 are respectively spaced by a half and 3½ pitches from this axis while in the set 13 the equivalent spacing is 1½ and 2½ pitches.

These units are built up into the structure by stacking them one over the other but each unit is shifted angularly 60° relative to the preceding unit (compare FIGURE 2a with FIGURE 2b) so that one set of the members is parallel to one set in the preceding layer and the other set is at 60° to each of the sets in the preceding layer. It is believed that the manner of building up the structure is most clearly seen by illustration in FIGURES 1 and 3, but more especially in FIGURE 3 succeeding units making up the various layers are identified by reference numerals 16, 17, 18, 19, 20, 21.

In each unit as so far described, the sets of strips 12, 13 are slotted at the points of intersection to less than half their width and interengage in the manner of an egg box. Because the slots only extend to less than half the width of the strips, each set is offset axially relative to the other and each face of the unit is defined by edges of only one set of members. In the preferred embodiment, the sequence of units is so arranged that strips which are parallel one to the other in adjacent units are remote from each other. This widens the separation between the adjacent edges of parallel strips in the two units and reduces the hydraulic impedance.

The application of the locating structure as so far described to the fuel assembly of FIGURE 5 will now be considered. As seen in this figure, the assembly has an outer tubular casing or wrapper 22 which for the greater part of its length has a polygonal shape, i.e., the shape of a regular hexagon in the present case. This hexagonal shape merges towards the upper end into a cylindrical top section 23 and towards the lower end it is fixed to a ring 24 carrying a bottom end fitting indicated generally 25. Fixed in the hexagonal length of casing adjacent the top section and the bottom end fitting are fuel pin supports 26 and 27 each comprising an openwork backing 28 which is grooved to receive bars 29 arranged in parallel relationship in registry with the rows of fuel pins 11 formed in one direction by the triangular lattice array. The fuel pin ends are necked and have a simple closure such as a weld at the neck. In the cold condition, the distance between the opposing plain faces of the bars 29 of the supports 26 and 27 is somewhat greater than the fuel pin length, as by a quarter of an inch, so that the pins can be said to "float" between the supports. It is also relevant, as shown by the fuel pin appearing in section, that an unfuelled and reduced diameter length 30 amounting to nearly half the overall pin length is arranged towards the lower end of the assembly to act as a reservoir for fission product gases liberated from the fuel. Beyond this unfuelled length there is a lower axial breeder fuel section 31, an enriched fuel section 32 and an upper axial breeder fuel section 33, these sections together constituting the heat exchange length of the fuel pin as indicated by the dimension H in FIGURE 5.

Reliance is placed on locating structure in accordance with the invention to maintain the triangular lattice array of the fuel pins. To this end layers of parallel strips are stacked over the whole length of the fuel pin array including the unfuelled length 30. However, it is only in the length H that the stack is formed of the units of FIGURES 1 to 4 and the thickness of strip employed in these units is enough to fill the gaps between the rows of pins; for example, if the pins have a diameter of 0.4 inch on a triangular pitch of 0.29 inch, these being typical dimensions for fast reactor fuel pins to be cooled by a liquid metal such as sodium, the strip thickness would be nominally 0.021 inch. The strip width may be 0.625 inch and the layer pairs in each unit so far overlapped as to give an overall unit width or depth of one inch. For a length H of 4.5 feet, as many as 54 stacked identical units would be needed, this being equivalent to nine in each particular angular orientation. However, for the illustrated assembly, the following departures from this basic arrangement are present: Firstly, the units employed in a portion of length corresponding to the lower axial breeder section 31 are deeper by virtue of greater strip width and/or less overlap of the layer pairs. The resulting lower standard of location is permissible in this portion of length because the flow of coolant through the assembly is upwards and this portion will have a lower operating temperature than higher up. The deeper units represent a lesser extent of layer pair overlap per unit length of assembly and therefore less flow impedance. Secondly, the last or penultimate unit at the top of the fuel pin array is replaced by a grid of a conventional kind having strips passing through every gap in two directions so as to define rhomboidal cells for each fuel pin; this is a precaution to ensure that there can be no spacing deviations where the pins abut the bars 29 of the support 26 and consequently avoid the possibility of pins becoming incorrectly registered.

In the unfuelled length 30, an even further lowered standard of location is appropriate in view of the reduction of flow impedance to be gained thereby. A variety of modifications compared with the units of FIGURES 1 to 4 is introduced for this purpose: Firstly the depth of the layer pairs forming the units is further increased, for example, to 2 inches; secondly the strip thickness is rather less than is necessary to fill the gaps between the rows of pins (if the reduction of pin diameter in the unfuelled length is such as to give a gap of 0.040 inch, a convenient strip thickness is nominally 0.031 inch); thirdly the spacing between parallel strips in each layer is eight pitches instead of four. This larger strip spacing calls for four different layer types. It is preferred that these types are combined in pairs rather than embodied into a larger unit having one of all four. Consequently the units will be of two layers as before, but there will be two forms of unit as shown respectively in FIGURES 6a and 6b.

In FIGURE 6a, the layer type constituted by the set of parallel strips 34 has the two strips nearest the central axis 9 spaced from this axis by 3½ and 4½ pitches respectively while in the set 35 the equivalent spacing is ½ and 7½ pitches. Likewise in FIGURE 6b the spacings are 2½ and 5½ pitches for the set 36 and 1½ and 6½ pitches for the set 37. The circumstances applicable to these units favour overlap of the layer pairs in each unit to the point of coincidence and accordingly the slotting at the points of intersection is to half the strip width. For an unfuelled length of 4 feet, as many as 24 stacked units would be needed, i.e., 12 of each form of unit. This is equivalent to two of each unit in each particular angular orientation. However there would be included, as before, adjacent the support 27 a grid for avoiding incorrect registration of the pins with the bars 29. The sequence of the two forms of unit is to some extent a matter of choice; a guiding criterion, as already stated, is that strips in adjacent units which are parallel are preferably remote from each other.

Some further substitutions in the stack may be desirable: for example, at intervals in the length H a unit as illustrated may be replaced by a special grid adapted to impart swirl to the coolant. Alternatively the units as illustrated may be used only over an upstream portion, e.g., half, of the length H, the remainder being located by swirl promoting grids.

What we claim is:

1. In an assembly of elongate heat exchange elements arranged parallel to one another in a regular lattice array forming straight rows of elements, and gaps between the rows, in at least two directions, a locating structure constituted by strips stacked crosswise and on edge to form a stack over substantially the whole heat exchange length of the element array, the strips of each layer in the stack being only in gaps which run in the same direction and being in less than half the number of such gaps, while the stack as a whole provides at least one strip in every gap in each direction.

2. A locating structure according to claim 1, wherein the layers are joined together in pairs by interconnections at some at least of the points of intersection of the strips in the one layer with those in the other layer.

3. A locating structure according to claim 2, wherein the interconnections are constituted by interengaging slots formed in the strips at the intersection points, the slots being less than half the width of the strips at these points so that the one layer of each pair overlaps the other.

4. A locating structure according to claim 1, wherein the strips in each layer of the stack are of uniform width.

5. A locating structure for spacing elongate heat exchange elements arranged parallel to one another and comprising separately manufactured units of similar pattern of which at least three in a superposed relationship displaced angularly to one another serve together to complete pockets for the elements.

6. A locating structure according to claim 5, wherein each unit comprises at least one layer of straight parallel strips spaced apart uniformly by an even number of at least four pocket widths.

7. A locating structure according to claim 6 and for use in an assembly of elements arranged in regular lattice array forming straight rows of elements, and gaps between the rows, in at least two directions, wherein
    (a) in each layer of parallel strips, the two strips nearest to the axis of angular displacement are unequally spaced from this axis,
    (b) the layers conform to a number of different types equal to half the spacing between strips expressed in terms of pocket widths, the types being distinguished by different spacings of the two nearest strips from the angular displacement axis, and
    (c) the minimum number of each type is equal to twice the number of gap directions and in the superposed relationship of the units each type occurs at least once in as many evenly displaced angular orientations as said minimum number.

8. A locating structure according to claim 7, wherein the units each have a layer of each type therein and are identical.

9. A locating structure according to claim 7, wherein each unit comprises two different type layers arranged crosswise and overlapping in depth.

10. A locating structure according to claim 9, wherein the two layers overlap to the point of being coincident.

References Cited

UNITED STATES PATENTS

| | | | |
|---|---|---|---|
| 1,882,474 | 10/1932 | Black | 165—162 |
| 1,967,961 | 7/1934 | Metten | 165—162 |
| 3,164,529 | 1/1965 | Waine et al. | 165—162 |

ROBERT A. O'LEARY, Primary Examiner.

CHARLES SUKALO, Assistant Examiner.